United States Patent
Tseng et al.

(10) Patent No.: US 8,749,622 B2
(45) Date of Patent: Jun. 10, 2014

(54) METHOD AND SYSTEM FOR DISPLAYING 3D IMAGES

(75) Inventors: Szu-Heng Tseng, Hsin-Chu (TW); Hong-Shen Lin, Hsin-Chu (TW); Jhao-Quei Jhong, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 430 days.

(21) Appl. No.: 13/086,373

(22) Filed: Apr. 13, 2011

(65) Prior Publication Data

US 2012/0105749 A1    May 3, 2012

(30) Foreign Application Priority Data

Oct. 29, 2010    (TW) .............................. 99137295 A

(51) Int. Cl.
*H04N 13/04*    (2006.01)
*G03B 35/26*    (2006.01)
*G02B 27/22*    (2006.01)

(52) U.S. Cl.
CPC ............ *G03B 35/26* (2013.01); *G02B 27/2264* (2013.01); *G02B 27/2242* (2013.01); *H04N 13/0497* (2013.01)
USPC .................... 348/51; 348/40; 348/42; 348/69

(58) Field of Classification Search
CPC .... G03B 35/26; G02B 27/2264; G02C 7/101; H04N 13/0438; H04N 13/0497; H04N 13/0404; H04N 13/0409; H04N 13/0422
USPC ..................... 348/46–60, 40, 42, 69
See application file for complete search history.

(56) References Cited

U.S. PATENT DOCUMENTS

| | | | | |
|---|---|---|---|---|
| 5,422,987 A | * | 6/1995 | Yamada | 345/427 |
| 5,453,862 A | * | 9/1995 | Toko et al. | 349/129 |
| 5,532,852 A | * | 7/1996 | Kalmanash | 349/117 |
| 5,664,083 A | * | 9/1997 | Takeuchi et al. | 345/653 |
| 5,703,606 A | * | 12/1997 | Blundell | 345/22 |
| 5,742,262 A | * | 4/1998 | Tabata et al. | 345/8 |
| 5,745,197 A | * | 4/1998 | Leung et al. | 349/77 |
| 5,926,246 A | * | 7/1999 | Tomita et al. | 349/192 |
| 6,226,002 B1 | * | 5/2001 | Yano et al. | 345/419 |
| 6,252,624 B1 | * | 6/2001 | Yuasa et al. | 348/56 |
| 7,048,385 B2 | * | 5/2006 | Beeson et al. | 353/97 |
| 7,446,733 B1 | * | 11/2008 | Hirimai | 345/32 |
| 7,898,585 B2 | * | 3/2011 | Nam | 348/302 |
| 8,040,332 B2 | * | 10/2011 | Yamazaki et al. | 345/204 |
| 8,044,879 B2 | * | 10/2011 | Matveev et al. | 345/4 |
| 8,334,896 B2 | | 12/2012 | Park et al. | |

(Continued)

FOREIGN PATENT DOCUMENTS

CN    101408679 A    4/2009
CN    101776801 A    7/2010

(Continued)

*Primary Examiner* — Andy Rao
*Assistant Examiner* — Shan Elahi
(74) *Attorney, Agent, or Firm* — Winston Hsu; Scott Margo

(57) ABSTRACT

In a 3D display system, an AMOLED display panel is used for alternatively presenting left-eye images and right-eye images associated with specific images, and an LCD polarizing panel is used for providing the left-eye images and the right-eye images with different polarization angles. When the LCD polarizing panel is in the process of rotating its LCD molecules, corresponding OLED rows of the AMOLED display panel are sequentially turned off so as to display black images, thereby preventing crosstalk and improving display quality.

15 Claims, 9 Drawing Sheets

(56) References Cited

U.S. PATENT DOCUMENTS

| | | |
|---|---|---|
| 8,362,999 B2 | 1/2013 | Huang et al. |
| 2001/0005204 A1* | 6/2001 | Matsumoto et al. ........... 345/418 |
| 2002/0139475 A1* | 10/2002 | Chen et al. ............... 156/345.23 |
| 2003/0107701 A1* | 6/2003 | Shimoshikiryo et al. ..... 349/172 |
| 2005/0062905 A1* | 3/2005 | Kim et al. ........................ 349/95 |
| 2005/0247932 A1* | 11/2005 | Huang et al. .................... 257/59 |
| 2006/0158593 A1* | 7/2006 | Sakai et al. .................... 349/122 |
| 2007/0035830 A1* | 2/2007 | Matveev et al. ............... 359/464 |
| 2007/0041442 A1* | 2/2007 | Novelo .................... 375/240.12 |
| 2007/0069978 A1* | 3/2007 | Daiku ............................... 345/8 |
| 2007/0139343 A1* | 6/2007 | Wang et al. ..................... 345/98 |
| 2008/0079677 A1* | 4/2008 | Tai et al. ......................... 345/88 |
| 2009/0021469 A1* | 1/2009 | Yeo et al. ...................... 345/102 |
| 2009/0213049 A1* | 8/2009 | McCreary ....................... 345/80 |
| 2009/0225502 A1* | 9/2009 | Cheng et al. ............. 361/679.01 |
| 2009/0237324 A1* | 9/2009 | Oh et al. ......................... 345/1.1 |
| 2010/0066820 A1* | 3/2010 | Park et al. ........................ 348/53 |
| 2010/0110040 A1* | 5/2010 | Kim et al. ...................... 345/174 |
| 2010/0201275 A1* | 8/2010 | Cok et al. ....................... 315/158 |
| 2010/0295860 A1* | 11/2010 | Somerville et al. ........... 345/545 |
| 2011/0216170 A1* | 9/2011 | Daiku .............................. 348/51 |

FOREIGN PATENT DOCUMENTS

| | | |
|---|---|---|
| JP | 2004233932 | 8/2004 |
| TW | 200915284 | 4/2009 |
| TW | I312639 | 7/2009 |
| TW | 201024798 | 7/2010 |
| TW | 201027126 | 7/2010 |

\* cited by examiner

METHOD AND SYSTEM FOR DISPLAYING 3D IMAGES

BACKGROUND OF THE INVENTION

1. Field of the Invention

The present invention is related to a method and a system for displaying 3D images, and more particularly, to a method and a system for displaying 3D images with reduced image interference.

2. Description of the Prior Art

Three-dimensional (3D) display technology provides more vivid visual experiences than traditional two-dimensional (2D) display technology. In general, the stereoscopic image processing involves presenting left-eye images and right-eye images respectively to the left eye and right eye of a viewer. In this way, an illusion of depth is created by simulating normal vision. The visual cortex of the human brain fuses this into perception of a 3D scene or composition.

There are two major types of 3D viewing environments: autostereoscopic 3D display system and glasses-type 3D display system. In autostereoscopic viewing environment, stereoscopic images are directly generated using e-holographic, volumetric, or multi-planar optical devices and can be viewed without additional devices. However, in additional to higher costs, the depth/brightness performance of an autostereoscopic 3D display system is limited and its 3D effect varies with viewer position.

In glasses-type viewing environment, 3D viewing devices, such as polarizing glasses, shutter glasses, or anaglyph glasses are required to create the illusion of stereoscopic images from planer images. Polarizing glasses, widely used in I-MAX movie theaters, include two lenses with different polarization (such as a horizontally polarized left-eye lens and a vertically polarized right-eye lens). A projecting equipment is used for providing images with different polarization, such as horizontally polarized left-eye images and vertically polarized right-eye images). Therefore, a user can view the left-eye images with the left eye and the right-eye images with the right eye. The left-eye images and the right-eye images have identical contents but different depths, thereby capable of simulating stereoscopic effect in human brain.

In a prior art active-matrix organic light-emitting diode (AMOLED) 3D display system using polarizing glasses, a liquid crystal polarizing panel is disposed on an AMOLED display panel: when the AMOLED display panel is displaying left-eye images L, the liquid crystal molecules of the liquid crystal polarizing panel are rotated to a specific angle $\theta_L$; when the AMOLED display panel is displaying right-eye images R, the liquid crystal molecules of the liquid crystal polarizing panel are rotated to another specific angle $\theta_R$. Therefore, the left-eye images s L and the right-eye images R may be polarized differently.

FIG. 1 illustrates the operation of the prior 3D display system when the liquid crystal polarizing panel liquid changes the rotation of its crystal molecules according to the scan direction of the AMOLED display panel. Assuming left-eye images L and right-eye images R are alternatively displayed during the sub frame periods $F_{1L}$、$F_{1R}$、$F_{2L}$、$F_{2R}$..., and the prior art liquid crystal polarizing panel begins to switch the angle of its liquid crystal molecules at the start of each sub frame period. In the ideal scenario, the liquid crystal polarizing panel is able to make immediate angle switch of its liquid crystal molecules at the moment the AMOLED display panel switches between left-eye and right-eye images. In the real situation, the rotation of liquid crystal molecules requires a reaction time $T_{LC}$ (represented by the striped region in FIG. 1). For 120 Hz operational frequency, the length of the sub frame periods $F_{1L}$、$F_{1R}$、$F_{2L}$、$F_{2R}$... is 8.3 ms. Thus, the liquid crystal polarizing panel is configured to switch the angle of its liquid crystal molecules every 8.3 ms, but it takes reaction time $T_{LC}$ of about 3 ms before the liquid crystal molecules reach a predetermined angle. In other words, during the reaction time $T_{LC}$, the user can only view a single left-eye image or a single right-eye image in the ideal scenario, but the user actually views both the left-eye image and the right-eye image in reality. This kind of image crosstalk largely influences the display quality.

SUMMARY OF THE INVENTION

The present invention provides a method for displaying stereoscopic images, including dividing a frame period of a specific image into a first sub frame period and a second sub frame period; generating a corresponding first sub image and a corresponding second sub image according to the specific image; providing the first sub image during the first sub frame period and providing the second sub image during the second frame period; when the first sub frame period begins, starting to rotate liquid crystal molecules of a liquid crystal polarizing panel from a second angle to a first angle for providing a first polarization angle to the first sub image; during the first sub frame period when the liquid crystal molecules of the liquid crystal polarizing panel are rotating from the second angle to the first angle, turning off OLEDs in a pixel array of a display panel for displaying a black image; and after the liquid crystal molecules of the liquid crystal polarizing panel have reached the first angle in the first sub frame period, sequentially turning on each OLED row for displaying the first sub image.

The present invention further provides a 3D display system including an image processor configured to divide a frame period of a specific image into a first sub frame period and a second sub frame period and generate a corresponding first sub image and a corresponding second sub image according to the specific image; a display panel including a pixel array having a plurality of OLED rows; a driving circuit configured to provide the first sub image to corresponding OLEDs in the pixel array during the first sub frame period and provide the second sub image to corresponding OLEDs in the pixel array during the second sub frame period; a liquid crystal polarizing panel disposed at a side of the display panel for changing a polarization angle of an image by rotating liquid crystal molecules, wherein the first sub image has a first polarization angle after passing through the liquid crystal polarizing panel when the liquid crystal molecules are a first angle and the second sub image has a second polarization angle after passing through the liquid crystal polarizing panel when the liquid crystal molecules are a second angle; and a controller configured to control the liquid crystal polarizing panel so as to start rotating the liquid crystal molecules from the second angle to the first angle when the first sub frame period begins, control the liquid crystal polarizing panel so as to start rotating the liquid crystal molecules from the first angle to the second angle when the second sub frame period begins, and turn off OLEDs in the pixel array for displaying a black image during a period when the liquid crystal molecules of the liquid crystal polarizing panel are rotating from the first angle to the second angle or from the second angle to the first angle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
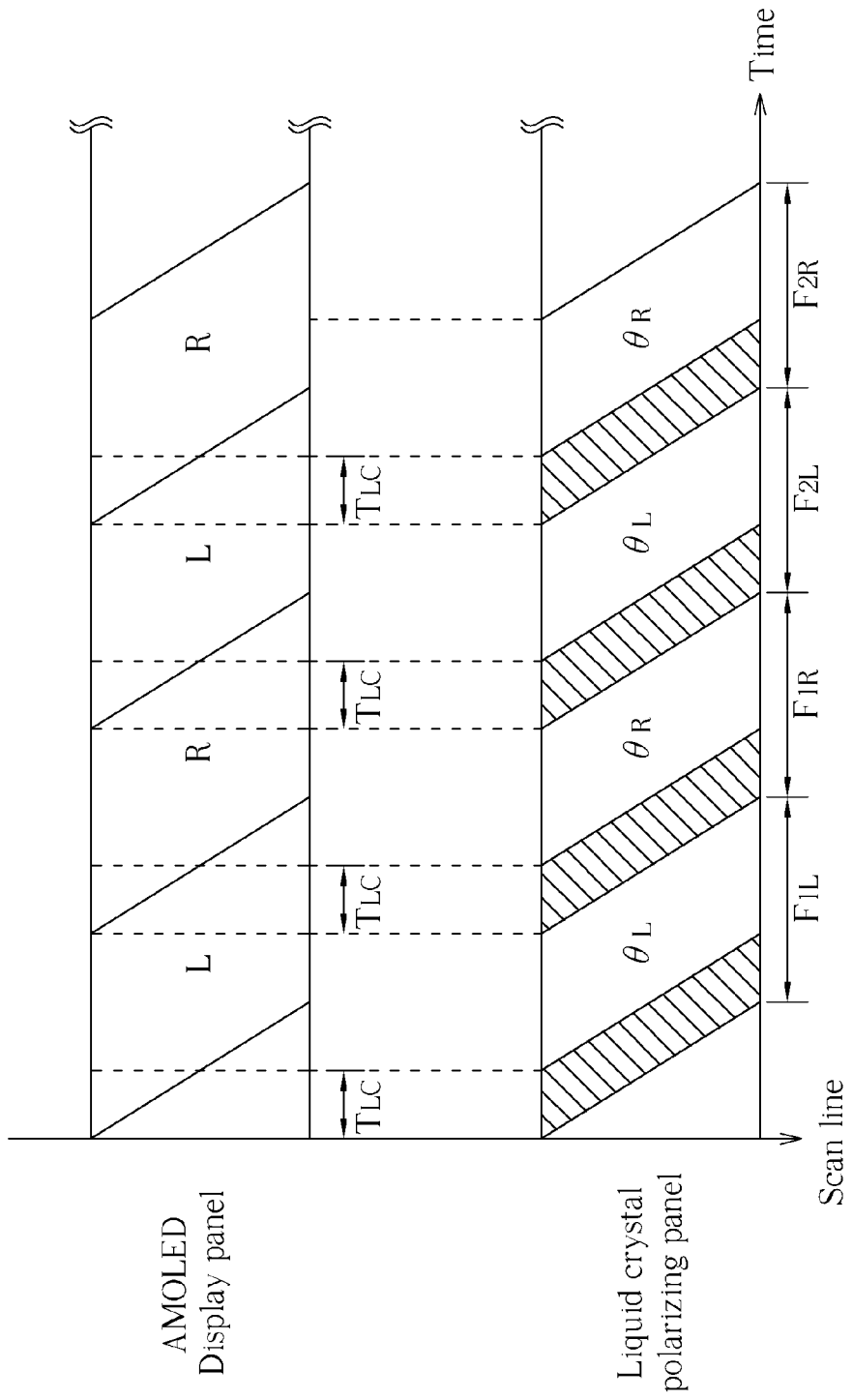
FIG. 1 is a diagram illustrating the operation of a prior 3D display system.
Figure 2:
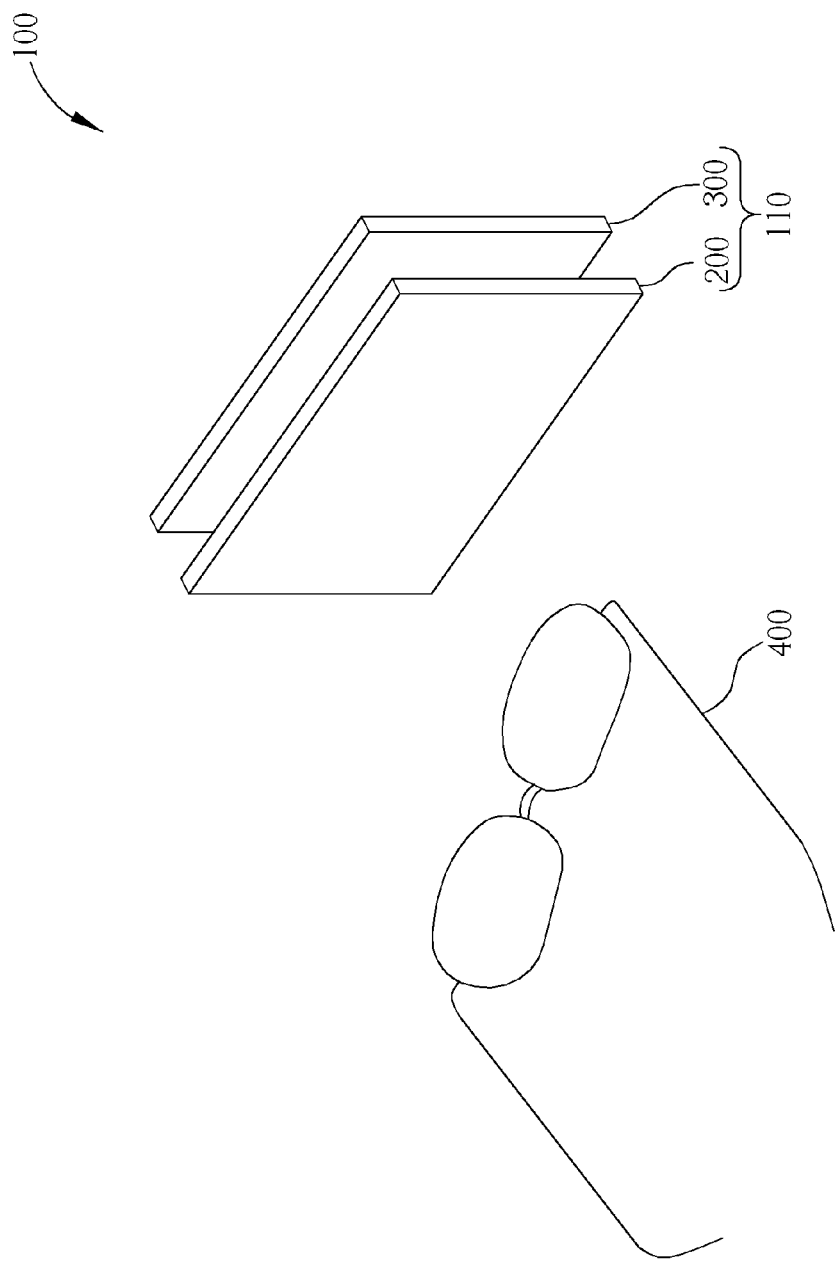
FIG. 2 is a diagram illustrating a 3D display system according to the present invention.

FIG. 2 is a diagram illustrating a display module 110 and polarizing glasses 400 of a 3D display system 100 according to the present invention. The display module 110 is configured to display a specific image by presenting left-eye images and right-eye images having different polarizations during a frame period. The left-eye lens and the right-eye lens of the polarizing glasses 400 each allow the light with certain polarization to pass and block the light with other polarizations. Therefore, the user may view the left-eye images with the left eye and view the right-eye images with the right eye, thereby perceiving stereoscopic effects.

Figure 3:
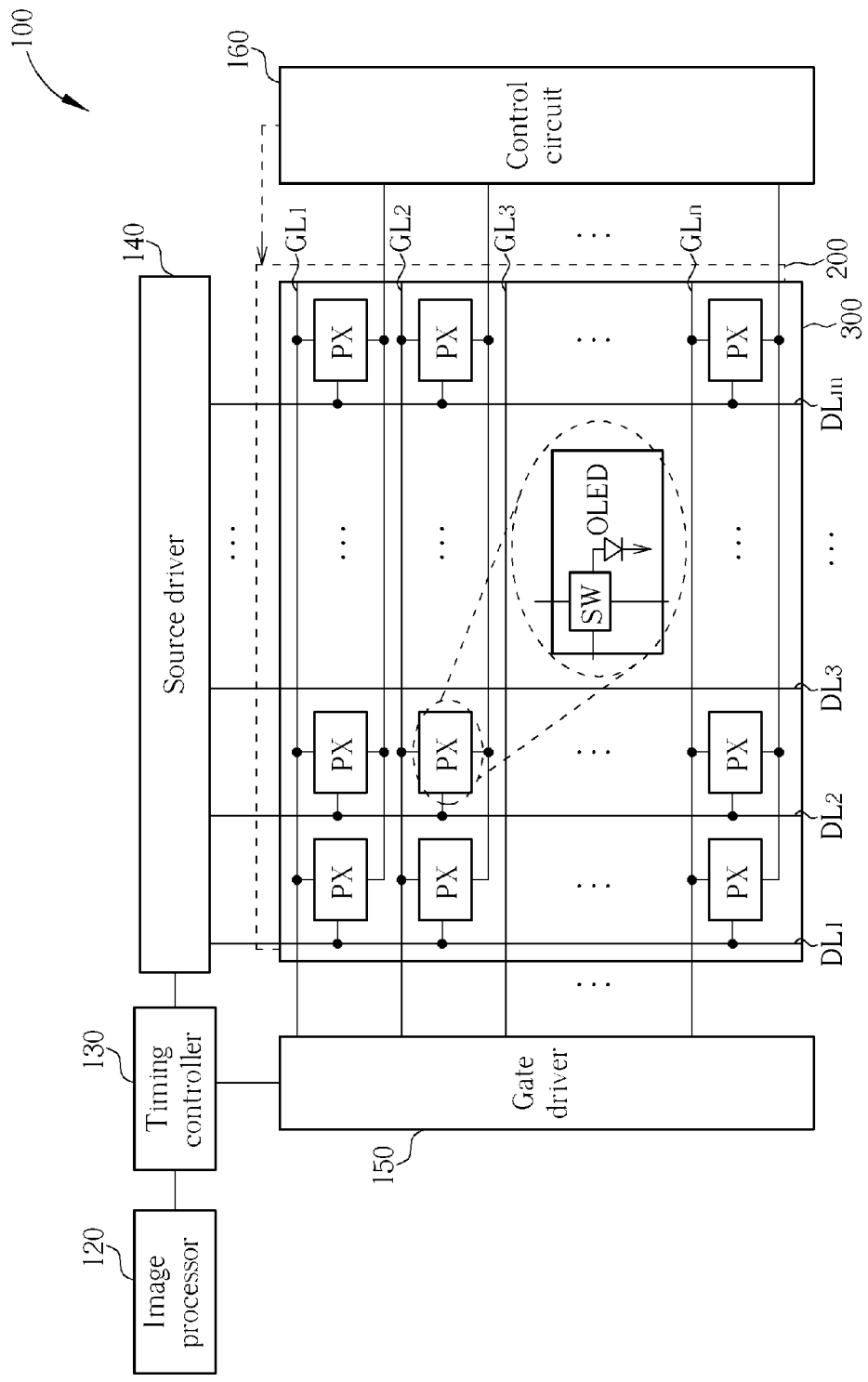
FIG. 3 is a functional diagram of a display module in the 3D display system according to the present invention.

FIG. 3 is a functional diagram of the display module 110 in the 3D display system 100 according to the present invention. The display module includes an image processor 120, a timing controller 130, a source driver 140, a gate driver 150, a control circuit 160, a liquid crystal polarizing panel 200, and an AMOLED display panel 300. A plurality of data lines $DL_1$-$DL_m$, a plurality of gate lines $GL_1$-$GL_n$, and a pixel array are disposed on the AMOLED display panel 300. The pixel array includes a plurality of active pixel units PX each having a switch circuit SW and an OLED.

The image processor 120 is configured to generate a sequential stereo audio signal with multiplied frequency according to an original audio signal. In other words, the frame period (such as 1/60 second) of the original audio signal is divided into two sub frame periods (such as 1/120 second) with the same length. Therefore, a left-eye image and a right-eye image associated with the same image may be provided according to the sequential stereo audio signal by means of frequency multiplication.

According to the signals generated by the timing controller 130, the source driver 140 is configured to output source driving signals associated with display images to the data lines $DL_1$-$DL_m$, while the gate driver 150 is configured to output gate driving signals for enabling or disabling the gate lines $GL_1$-$GL_n$. For example, when the gate driver 150 activates the gate line $GL_1$, the source driving signal generated by source driver 140 may be transmitted to the first row of active pixel units PX.

As depicted in FIG. 2, the liquid crystal polarizing panel 200 is disposed between the AMOLED panel 300 and the user wearing the polarizing glasses 400, and is configured to polarize the display images of the AMOLED panel 300. In the embodiment of the present invention, the liquid crystal polarizing panel 200 and the AMOLED panel 300 may have similar structures in which corresponding gate lines and data lines are configured to rotate the liquid crystal molecules in response to a control signal. For example, after passing through the liquid crystal molecules of the liquid crystal polarizing panel 200 which are rotated to have a first angle, images may be polarized into a first polarization direction; after passing through the liquid crystal molecules of the liquid crystal polarizing panel 200 which are rotated to have a second angle, images may be polarized into a second polarization direction.

The control circuit 160 is configured to control the liquid crystal polarizing panel 200 so that the liquid crystal molecules may switch between two specific angles according to the left-eye and right-eye images outputted by the AMOLED display panel 300. For example, when the AMOLED display panel 300 enters the sub frame period for displaying the left-eye images, the control circuit 160 switches the liquid crystal molecules of the liquid crystal polarizing panel 200 to a first angle so that the left-eye images may be polarized into the first polarization direction after passing through; when the AMOLED display panel 300 enters the sub frame period for displaying the right-eye images, the control circuit 160 switches the liquid crystal molecules of the liquid crystal polarizing panel 200 to a second angle so that the right-eye images may be polarized into the second polarization direction after passing through.

On the other hand, since the liquid crystal has slower reaction than the OLED, the control circuit 160 of the present invention is configured to switch off the corresponding OLEDs in the pixel array for displaying black images during the process when liquid crystal polarizing panel 200 switches the angle of its liquid crystal molecules. After the liquid crystal molecules of the liquid crystal polarizing panel 200 have reached a predetermined angle, the control circuit 160 of the present invention is configured to turn on the corresponding OLEDs in the pixel array for displaying the corresponding left-eye and right-eye images. To be more specific, the present invention may perform black-insertion on a line-by-line basis, which will be illustrated in more detail.

Figure 4:
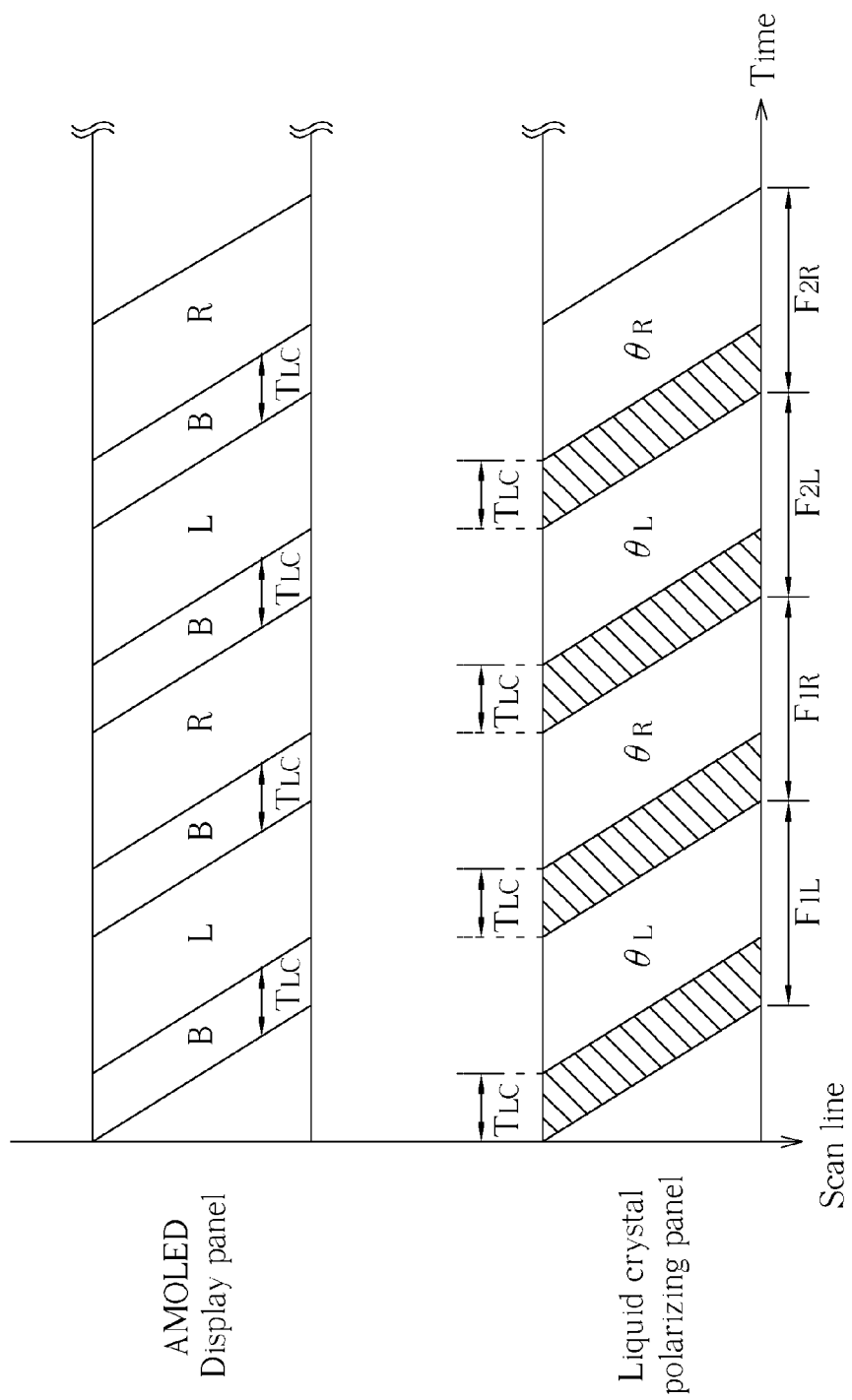
FIG. 4 is a diagram illustrating the operation of the 3D display system according to the present invention.

FIG. 4 is a diagram illustrating the operation of the 3D display system 100 according to the present invention. Left-eye images L and right-eye images R are alternatively provided during the sub frame periods $F_{1L}$、$F_{1R}$、$F_{2L}$、$F_{2R}$..., and the liquid crystal polarizing panel 200 begins to switch the angle of its liquid crystal molecules at the start of each sub frame period. During the period $T_{LC}$ (represented by the striped region in FIG. 4) when the liquid crystal molecules are in the process of rotating, the source driving signals outputted by the source driver 140 are sequentially outputted to each corresponding row of active pixel units PX, but the control circuit 160 of the present invention turns off the corresponding OLEDs in the pixel array at the same time for displaying black images B during $T_{LC}$. After the liquid crystal molecules of the liquid crystal polarizing panel 200 have reached the predetermined angle, the control circuit 160 of the present invention turns on the corresponding OLEDs in the pixel array for displaying the corresponding left-eye images L and right-eye images R according to the source driving signals outputted by the source driver 140. As depicted in FIG. 4, the present invention may perform black-insertion on a line-by-line basis by sequentially turning off each corresponding row of OLEDs in the pixel array when the liquid crystal molecules are in the process of rotating, thereby preventing the left-eye images L and the right-eye images R from interfering with each other and improving display quality.

FIGS. 5A-5D are diagrams illustrating embodiments of an active pixel unit PX in the pixel array according to the present invention. In the embodiment illustrated I FIG. 5A, the switch circuit SW includes thin film transistor switches TFT1, TFT2 and a capacitor C. The thin film transistor switch TFT1 includes a control end coupled to a corresponding gate line (represented by GL), a first end coupled to a corresponding data line (represented by DL), and a second end coupled to a first end of the capacitor C. The thin film transistor switch TFT2 includes a control end coupled to the first end of the capacitor C, a first end coupled to a variable voltage VT1, and a second end coupled to a second end of the capacitor C. The OLED is coupled between the second end of the capacitor C and a constant DC voltage VSS. The level of the variable voltage VT1 may be controlled by the control circuit 160.

Figure 5A:
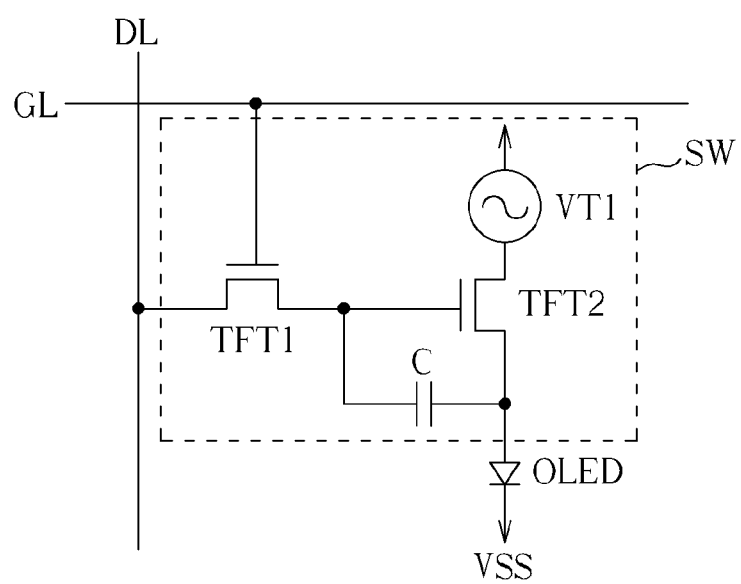
FIGS. 5A-5D are diagrams illustrating embodiments of an active pixel unit in the pixel array according to the present invention.
Figure 5B:
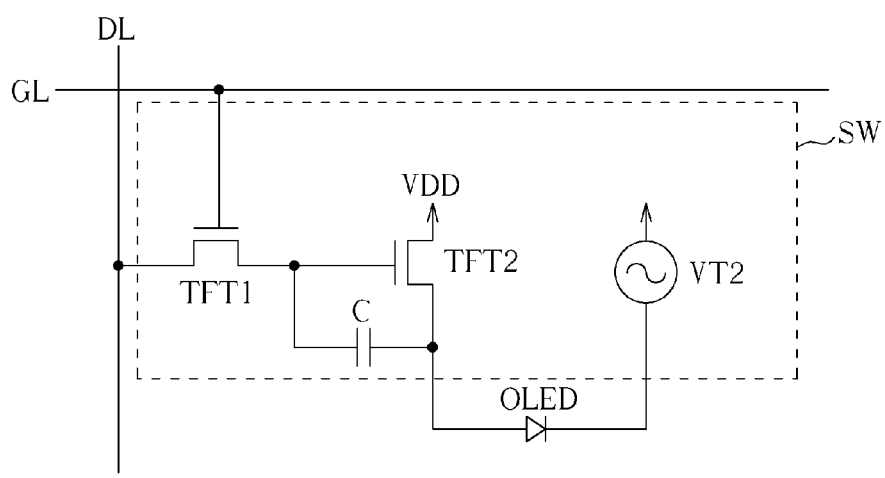

In the embodiment illustrated I FIG. 5B, the switch circuit SW includes thin film transistor switches TFT1, TFT2 and a capacitor C. The thin film transistor switch TFT1 includes a control end coupled to a corresponding gate line (represented by GL), a first end coupled to a corresponding data line (represented by DL), and a second end coupled to a first end of the capacitor C. The thin film transistor switch TFT2 includes a control end coupled to the first end of the capacitor C, a first end coupled to a constant DC voltage VDD, and a second end coupled to a second end of the capacitor C. The OLED is coupled between the second end of the capacitor C and a variable voltage VT2. The level of the variable voltage VT2 may be controlled by the control circuit 160.

Figure 5C:
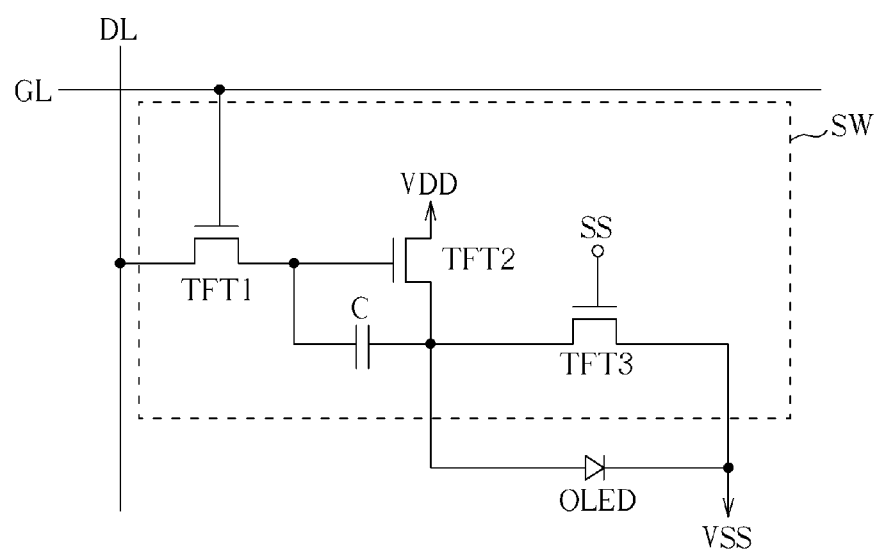

In the embodiment illustrated I FIG. 5C, the switch circuit SW includes thin film transistor switches TFT1-TFT3 and a capacitor C. The thin film transistor switch TFT1 includes a control end coupled to a corresponding gate line (represented by GL), a first end coupled to a corresponding data line (represented by DL), and a second end coupled to a first end of the capacitor C. The thin film transistor switch TFT2 includes a control end coupled to the first end of the capacitor C, a first end coupled to constant DC voltage VDD, and a second end coupled to a second end of the capacitor C. The OLED is coupled between the second end of the capacitor C and a constant DC voltage VSS. The thin film transistor switch TFT3 is coupled in parallel with the OLED and includes a control end coupled to the control circuit 160 for receiving a control signal SS.

Figure 5D:
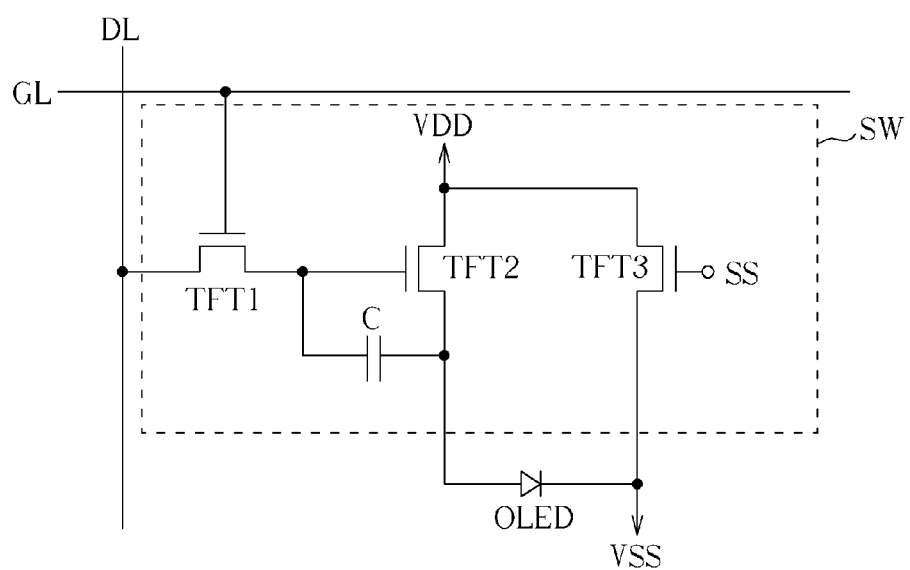

In the embodiment illustrated I FIG. 5D, the switch circuit SW includes thin film transistor switches TFT1-TFT3 and a capacitor C. The thin film transistor switch TFT1 includes a control end coupled to a corresponding gate line (represented by GL), a first end coupled to a corresponding data line (represented by DL), and a second end coupled to a first end of the capacitor C. The thin film transistor switch TFT2 includes a control end coupled to the first end of the capacitor C, a first end coupled to a constant DC voltage VDD, and a second end coupled to a second end of the capacitor C. The OLED is coupled between the second end of the capacitor C and a constant DC voltage VSS. The thin film transistor switch TFT3 is coupled between the constant DC voltages VDD and VSS and includes a control end coupled to the control circuit 160 for receiving a control signal SS.

Figure 6:
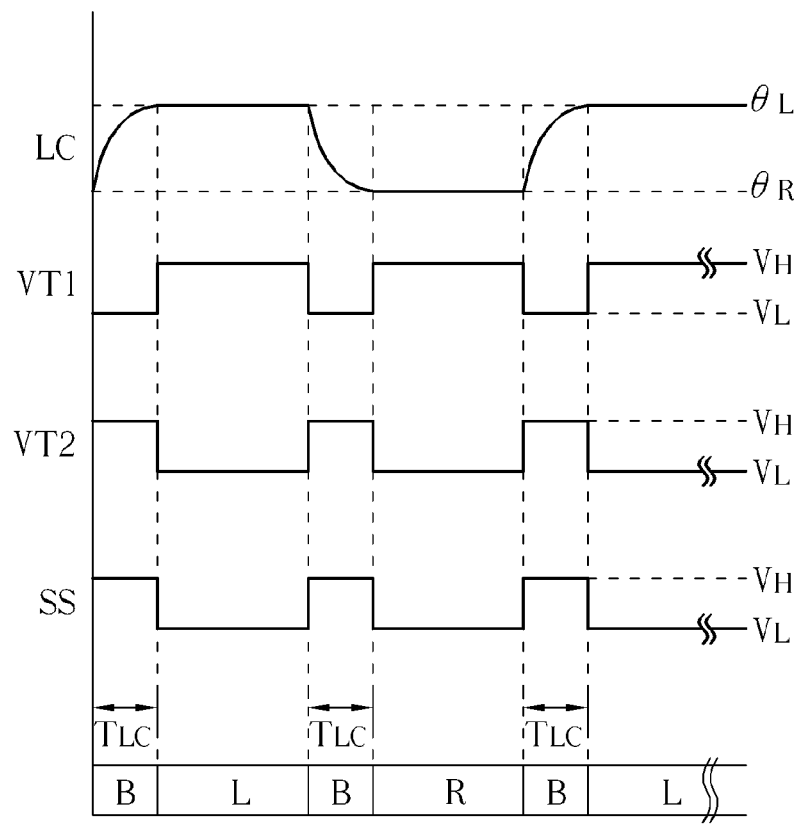
FIG. 6 is a diagram illustrating the operation of the 3D display system according to the embodiments in FIGS. 5A-5D.

FIG. 6 is a diagram illustrating the operation of the 3D display system 100 according to the embodiments in FIGS. 5A-5D. In FIG. 6, the operation of the embodiment depicted in FIG. 5A is first illustrated. At the beginning of the sub frame period, the thin film transistor TFT1 is turned on, allowing the source driving signal to charge the capacitor C, thereby turning on the thin film transistor TFT2. During the period $T_{LC}$ when the liquid crystal molecules of the liquid crystal polarizing panel 200 are rotating, the control circuit 160 is configured to maintain the variable voltage VT1 at a low level VL so that (VL−VSS) is smaller than the turn-on voltage of the OLED, thereby turning off the OLED for displaying black images B. After the liquid crystal molecules of the liquid crystal polarizing panel 200 have reached the predetermined angle, the control circuit 160 is configured to switch the variable voltage VT1 to a high level VH for turning off the thin film transistor switch TFT2, thereby allowing the source driving signals to turn on the OLED and displaying the corresponding left-eye images L or the corresponding right-eye images R.

In FIG. 6, the operation of the embodiment depicted in FIG. 5B is next illustrated. At the beginning of the sub frame period, the thin film transistor TFT1 is turned on, allowing the source driving signal to charge the capacitor C, thereby turning on the thin film transistor TFT2. During the period $T_{LC}$ when the liquid crystal molecules of the liquid crystal polarizing panel 200 are rotating, the control circuit 160 is configured to maintain the variable voltage VT2 at a high level VH so that (VDD−VH) is smaller than the turn-on voltage of the OLED, thereby turning off the OLED for displaying black images B. After the liquid crystal molecules of the liquid crystal polarizing panel 200 have reached the predetermined angle, the control circuit 160 is configured to switch the variable voltage VT2 to a low level VL so that the voltage difference between the source driving signal and VL is larger than the turn-on voltage of the OLED, thereby turning on the OLED and displaying the corresponding the corresponding left-eye images L or the corresponding right-eye images according to the source driving signals.

In FIG. 6, the operation of the embodiment depicted in FIG. 5C is next illustrated. At the beginning of the sub frame period, the thin film transistor TFT1 is turned on, allowing the source driving signal to charge the capacitor C, thereby turning on the thin film transistor TFT2. During the period $T_{LC}$ when the liquid crystal molecules of the liquid crystal polarizing panel 200 are rotating, the control circuit 160 is configured to output the control signal VSS having an enable level (such as high level VH) so that the OLED may be turned off for displaying black images B since its anode and cathode are coupled to each other via the conducting thin film transistor switch TFT3. After the liquid crystal molecules of the liquid crystal polarizing panel 200 have reached the predetermined angle, the control circuit 160 is configured to output the control signal VSS having a disable level (such as low level VL) for turning off the thin film transistor switch TFT3, thereby allowing the OLED to display the corresponding left-eye images L or the corresponding right-eye images according to the source driving signals.

In FIG. 6, the operation of the embodiment depicted in FIG. 5D is next illustrated. At the beginning of the sub frame period, the thin film transistor TFT1 is turned on, allowing the source driving signal to charge the capacitor C, thereby turning on the thin film transistor TFT2. During the period $T_{LC}$ when the liquid crystal molecules of the liquid crystal polarizing panel 200 are rotating, the control circuit 160 is configured to output the control signal VSS having an enable level (such as high level VH) so that the OLED may be turned off for displaying black images B since its anode is coupled to the constant DC voltage via the conducting thin film transistor switch TFT3, wherein the voltage difference between the source driving signal and VL is smaller than the turn-on voltage of the OLED. After the liquid crystal molecules of the liquid crystal polarizing panel 200 have reached the predetermined angle, the control circuit 160 is configured to output the control signal VSS having a disable level (such as low level VL) for turning off the thin film transistor switch TFT3, thereby allowing the OLED to display the corresponding left-eye images L or the corresponding right-eye images according to the source driving signals.

FIG. 6 depicts the driving signals of the active pixels PX which are coupled to a specific gate line of the AMOLED display panel 300. Similar approach may be used for driving each row of active pixel units PX. In the present invention, the liquid crystal polarizing panel 200 may be divided into a plurality of regions each corresponding to N adjacent gate lines (1≤N≤n) of the AMOLED display panel 300. After scanning the last gate line of the AMOLED display panel 300 during a previous sub frame period in which left-eye images are displayed, the liquid crystal molecules in each region of the liquid crystal polarizing panel 200 are sequentially rotated. Meanwhile, the control circuit 160 switches the level of the variable voltage VT1, the variable voltage VT2 or the control signal SS, forcing all OLEDs to remain off for display black images when the liquid crystal molecules are rotating, thereby preventing the left-eye images L and the right-eye images R from interfering with each other.

In one embodiment of the present invention, the liquid crystal polarizing panel 200 and the AMOLED display panel 300 may have identical resolution, such as having the same amount of data lines and gate lines with the same layout (N=1). Therefore, the control circuit 160 may switch the level of the variable voltage VT1, the variable voltage VT2 or the control signal SS after scanning each gate line. In another embodiment of the present invention, the liquid crystal polarizing panel 200 may have a smaller resolution than the AMOLED display panel 300. For example, the liquid crystal polarizing panel 200 may include fewer gate lines (2≤N≤n) and the same amount of data lines compared to the AMOLED display panel 300. Therefore, the control circuit 160 may switch the level of the variable voltage VT1, the variable voltage VT2 or the control signal SS after scanning a plurality of gate lines. On the other hand, the liquid crystal polarizing panel 200 may only include gate lines and the level of the variable voltage VT1, the variable voltage VT2 or the control signal SS may be switched after scanning a predetermined amount of gate lines. The previous embodiments are used for illustrating how the liquid crystal polarizing panel 200 may rotate its liquid crystal molecules, but do not limit the scope of the present invention.

In the 3D display system according to the present invention, left-eye images and right-eye images associated with specific images are alternatively presented on the AMOLED display panel, and are polarized into different polarization directions by the liquid crystal polarizing panel. Black-insertion may be performed on a line-by-line basis by sequentially turning off each corresponding row of OLEDs in the pixel array when the liquid crystal molecules are rotating, thereby preventing the left-eye images L and the right-eye images R from interfering with each other and improving display quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for displaying three-dimensional (3D) images, comprising:
    dividing a frame period of a specific image into a first sub frame period and a second sub frame period;
    generating a corresponding first sub image and a corresponding second sub image according to the specific image;
    providing the first sub image during the first sub frame period and providing the second sub image during the second frame period;
    when the first sub frame period begins, starting to rotate liquid crystal molecules of a liquid crystal polarizing panel from a second angle to a first angle for providing a first polarization angle to the first sub image;
    during the first sub frame period when the liquid crystal molecules of the liquid crystal polarizing panel are rotating from the second angle to the first angle, turning off organic light-emitting diodes (OLEDs) in a pixel array of a display panel for displaying a black image; and
    after the liquid crystal molecules of the liquid crystal polarizing panel have reached the first angle in the first sub frame period, sequentially turning on each OLED row for displaying the first sub image.

2. The method of claim 1, further comprising:
    dividing the liquid crystal polarizing panel into a plurality of regions;
    when the first sub frame period begins, starting to rotate liquid crystal molecules in a specific region of the liquid crystal polarizing panel from the second angle to the first angle; and
    during the first sub frame period when the liquid crystal molecules in the specific region of the liquid crystal polarizing panel are rotating from the second angle to the first angle, turning off OLEDs of the display panel which correspond to the specific region.

3. The method of claim 2, wherein:
    each region of the liquid crystal polarizing panel corresponds to a plurality of OLED rows of the display panel, or corresponds to each OLED row of the display panel.

4. The method of claim 1, further comprising:
    when the second sub frame period begins, starting to rotate the liquid crystal molecules of the liquid crystal polarizing panel from the first angle to the second angle for providing a second polarization angle to the second sub image;
    during the second sub frame period when the liquid crystal molecules of the liquid crystal polarizing panel are rotating from the first angle to the second angle, separately turning off each OLED row in the pixel array of the display panel for displaying a black image; and
    after the liquid crystal molecules of the liquid crystal polarizing panel have reached the second angle in the second sub frame period, sequentially turning on each OLED row for displaying the second sub image.

5. The method of claim 4, further comprising:
    during the second sub frame period when the liquid crystal molecules of the liquid crystal polarizing panel are rotating from the first angle to the second angle, separately turning off each OLED row in the pixel array of the display panel in a line-by-line sequence for displaying the black image.

6. The method of claim 4, further comprising:
    dividing the liquid crystal polarizing panel into a plurality of regions;
    when the second sub frame period begins, starting to rotate liquid crystal molecules in a specific region of the liquid crystal polarizing panel from the first angle to the second angle; and
    during the second sub frame period when the liquid crystal molecules in the specific region of the liquid crystal polarizing panel are rotating from the first angle to the second angle, turning off OLEDs of the display panel which correspond to the specific region.

7. The method of claim 5, wherein:
    each region of the liquid crystal polarizing panel corresponds to a plurality of OLED rows of the display panel, or corresponds to each AMOLED row of the display panel.

8. The method of claim 1, further comprising:
transmitting the first sub image having the first polarization angle to a first eye of a user during the first sub frame period; and
transmitting the second sub image having the second polarization angle to a second eye of the user during the second sub frame period.

9. The method of claim 1, further comprising:
blocking an image which does not have the first polarization angle from the first eye of the user; and
blocking an image which does not have the second polarization angle from the second eye of the user.

10. The method of claim 1, wherein the first sub frame period and the second sub frame period are of a same length.

11. The method of claim 1, further comprising:
during the first sub frame period when the liquid crystal molecules of the liquid crystal polarizing panel are rotating from the second angle to the first angle, separately turning off each OLED row in the pixel array of the display panel in a line-by-line sequence for displaying the black image.

12. A three-dimensional (3D) display system, comprising:
an image processor configured to divide a frame period of a specific image into a first sub frame period and a second sub frame period and generate a corresponding first sub image and a corresponding second sub image according to the specific image;
a display panel including a pixel array having a plurality of OLED rows;
a driving circuit configured to provide the first sub image to corresponding OLEDs in the pixel array during the first sub frame period and provide the second sub image to corresponding OLEDs in the pixel array during the second sub frame period;
a liquid crystal polarizing panel disposed at a side of the display panel for changing a polarization angle of an image by rotating liquid crystal molecules of the liquid crystal polarizing panel, wherein the first sub image has a first polarization angle after passing through the liquid crystal polarizing panel when the liquid crystal molecules are at a first angle and the second sub image has a second polarization angle after passing through the liquid crystal polarizing panel when the liquid crystal molecules are at a second angle; and
a controller configured to control the liquid crystal polarizing panel so as to start rotating the liquid crystal molecules from the second angle to the first angle when the first sub frame period begins, control the liquid crystal polarizing panel so as to start rotating the liquid crystal molecules from the first angle to the second angle when the second sub frame period begins, and turn off OLEDs in the pixel array for displaying a black image during a period when the liquid crystal molecules of the liquid crystal polarizing panel are rotating from the first angle to the second angle or from the second angle to the first angle.

13. The 3D display system of claim 12, wherein the controller is further configured to:
sequentially turning on each OLED row of the pixel array for displaying the first sub image after the liquid crystal molecules of the liquid crystal polarizing panel have reached the first angle in the first sub frame period, and
sequentially turning on each OLED row of the pixel array for displaying the second sub image after the liquid crystal molecules of the liquid crystal polarizing panel have reached the second angle in the second sub frame period.

14. The 3D display system of claim 12, further comprising a viewing device which includes:
a first lens for transmitting the first sub image having the first polarization angle to a first eye of a user and blocking an image which does not have the first polarization angle; and
a second lens for transmitting the second sub image having the second polarization angle to a second eye of the user and blocking an image which does not have the second polarization angle.

15. The 3D display system of claim 12, wherein the controller is further configured to separately turning off each OLED row in the pixel array of the display panel in a line-by-line sequence for displaying the black image during the period when the liquid crystal molecules of the liquid crystal polarizing panel are rotating from the first angle to the second angle or from the second angle to the first angle.

* * * * *